United States Patent
Rovira

(10) Patent No.: US 6,795,972 B2
(45) Date of Patent: Sep. 21, 2004

(54) SUBSCRIBER TELEVISION SYSTEM USER INTERFACE WITH A VIRTUAL REALITY MEDIA SPACE

(75) Inventor: Luis A. Rovira, Atlanta, GA (US)

(73) Assignee: Scientific-Atlanta, Inc., Lawrenceville, GA (US)

( * ) Notice: Subject to any disclaimer, the term of this patent is extended or adjusted under 35 U.S.C. 154(b) by 347 days.

(21) Appl. No.: 09/896,391

(22) Filed: Jun. 29, 2001

(65) Prior Publication Data

US 2003/0005439 A1 Jan. 2, 2003

(51) Int. Cl.[7] .......................... H04N 5/445; G06F 3/00; G06F 13/00
(52) U.S. Cl. .......................... 725/40; 725/44; 345/706; 345/782; 345/850
(58) Field of Search .............................. 725/38, 39, 40, 725/43, 44, 47, 51, 52, 60, 61; 463/40, 41, 42; 345/757, 706, 702, 850; H04N 5/445; G06F 3/00, 13/00

(56) References Cited

U.S. PATENT DOCUMENTS

| | | | | |
|---|---|---|---|---|
| 4,759,060 A | * | 7/1988 | Hayashi et al. ............. 380/234 |
| 5,400,402 A | * | 3/1995 | Garfinkle .................... 380/231 |
| 5,524,195 A | * | 6/1996 | Clanton, III et al. ......... 725/61 |
| 5,781,228 A | | 7/1998 | Sposato ....................... 348/13 |
| 5,956,716 A | * | 9/1999 | Kenner et al. ................ 707/10 |
| 6,009,460 A | * | 12/1999 | Ohno et al. .................. 709/204 |
| 6,020,885 A | * | 2/2000 | Honda ......................... 345/332 |
| 6,057,856 A | * | 5/2000 | Miyashita et al. .......... 345/435 |
| 6,205,485 B1 | | 3/2001 | Kikinis ....................... 709/231 |
| 6,227,973 B1 | * | 5/2001 | Kikuchi ....................... 463/31 |
| 6,272,231 B1 | * | 8/2001 | Maurer et al. .............. 382/103 |
| 6,397,080 B1 | * | 5/2002 | Viktorsson et al. ......... 455/558 |
| 6,421,067 B1 | | 7/2002 | Kamen et al. .............. 345/719 |
| 6,456,334 B1 | * | 9/2002 | Duhault ....................... 348/565 |
| 6,493,001 B1 | * | 12/2002 | Takagi et al. ................ 345/759 |
| 6,496,207 B1 | * | 12/2002 | Matsuda et al. ............. 345/848 |
| 6,574,798 B1 | * | 6/2003 | Bradley et al. ............. 725/153 |
| 6,637,027 B1 | * | 10/2003 | Breslauer et al. ............. 725/25 |

FOREIGN PATENT DOCUMENTS

JP        8087489        4/1995

* cited by examiner

*Primary Examiner*—Vivek Srivastava

(57) ABSTRACT

This invention provides a method for a subscriber television system client device to provide a three-dimensional user interface comprising a virtual reality media space. The three-dimensional user interface allows the user to navigate a three dimensional environment, participate in activities, and interact with other users. The three-dimensional user interface enables the user to associate personal characteristics with an avatar which represents the user in the system, such personal characteristics comprising a symbol, a picture, and video.

26 Claims, 8 Drawing Sheets

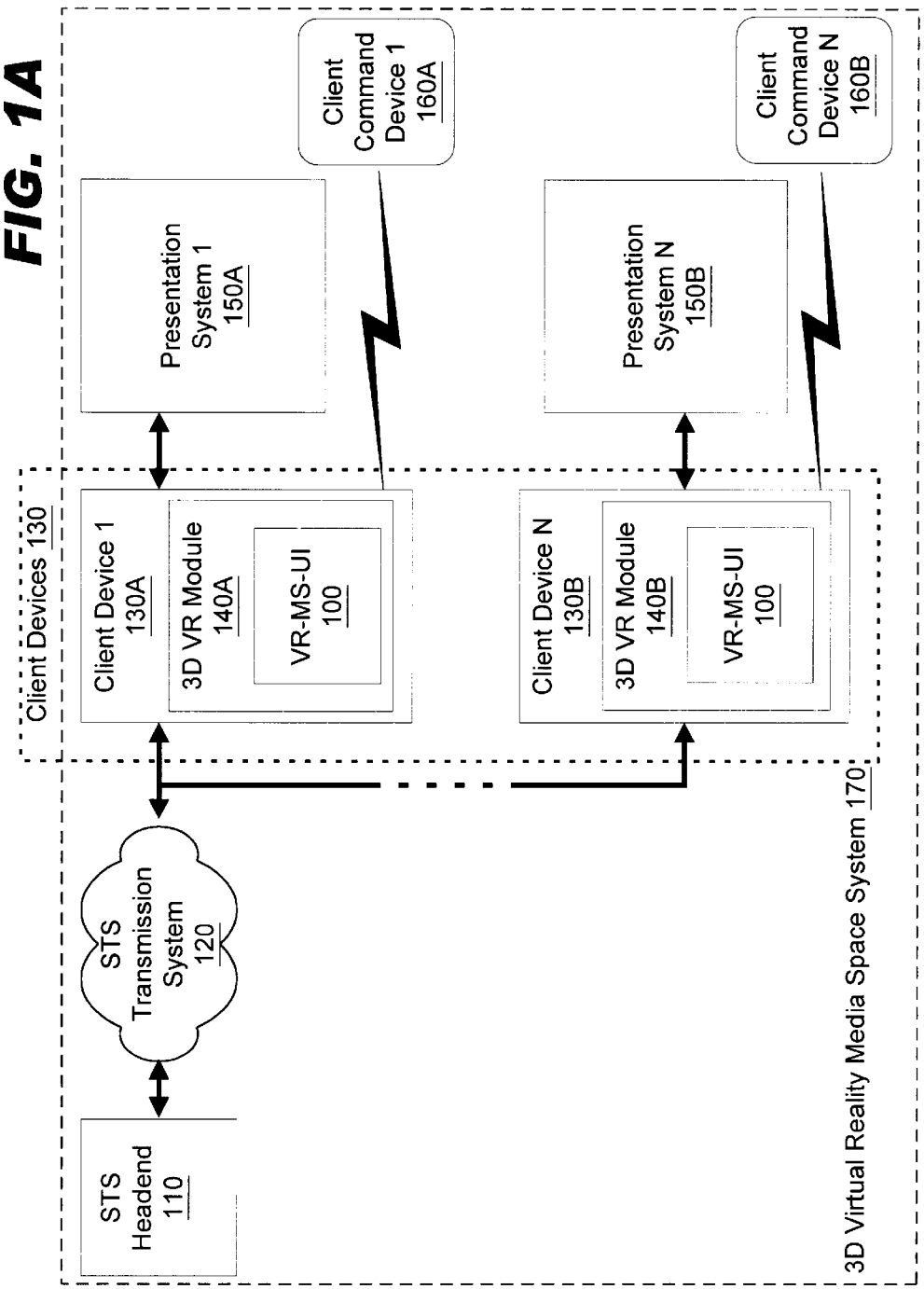

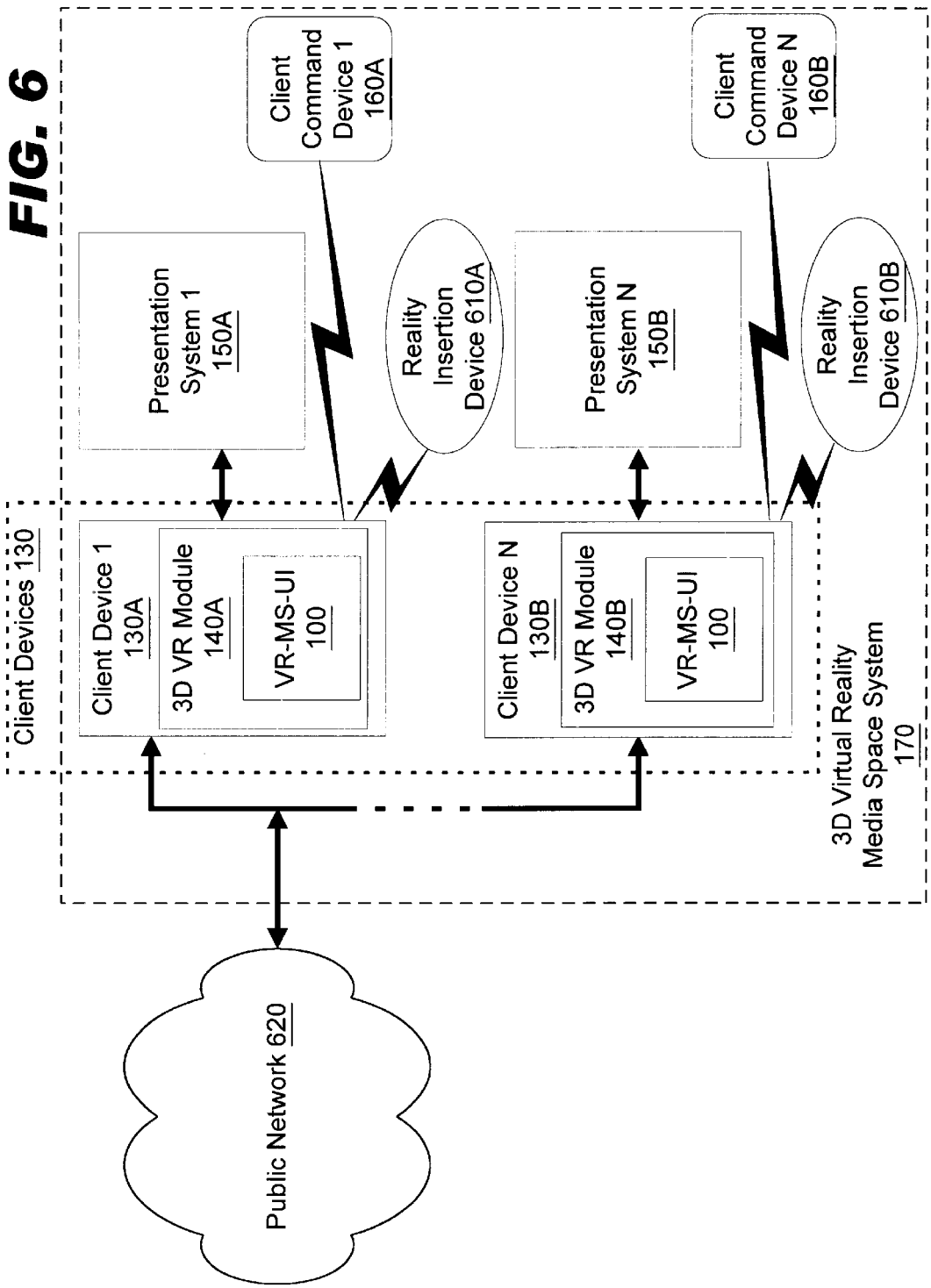

SUBSCRIBER TELEVISION SYSTEM USER INTERFACE WITH A VIRTUAL REALITY MEDIA SPACE

TECHNICAL FIELD

The present invention relates generally to the field of subscriber television systems, and in particular, to user interfaces for subscriber television systems.

BACKGROUND OF THE INVENTION

The explosion of technology in the world of communications and computing has enabled an amazing trend in the systems that people use for enjoyment, interaction, and communication. The trend involves recreating the environment in which we live. This has been made possible by the advancement of the technology that drives communication and computing. This general trend of reality based computer interaction is evident in most areas of advancing technology. Recent advancements in processing power and transmission capability have made it possible to take one giant step closer to recreating a realistic setting in a computer enabled system.

As people begin to use computing systems to effectuate everyday occurrences, such as working, shopping, and visiting friends, a desire emanates to have these systems more closely model reality. If these systems are to enhance and expedite day-to-day activities, then they should bring about the same feeling of interaction one achieves in reality. In order for a person to truly interact in a system, they need to feel that they are a part of that system. To enable this feeling of interaction some highly advanced systems allow the users to see images of themselves and their surroundings in a simulated world, a virtual reality. Highly advanced virtual reality systems create three dimensional (3D) worlds where a user navigates and interacts in a simulated 3D environment.

In the early days of virtual reality only bulky and expensive computing devices were powerful enough to enable a 3D user interface. The recent explosion of technology in the field of computing has advanced such that it is possible to have relatively inexpensive computing devices enable 3D virtual reality user interfaces. These 3D virtual reality worlds allow a user to explore a simulated environment. Such environments could be anything from an ordinary street scene with walkways, roads, and buildings to a completely fictitious landscape of an outer space planet. The end goal with most virtual reality interfaces is to give the user the most realistic experience possible.

One significant advancement in the effort to bring realism to virtual reality applications involves the use of avatars. As mentioned previously, one cannot truly interact within a system unless they feel they are a part of that system. An avatar is a tool that allows the user to have an icon inside the virtual reality world to represent the user. The word avatar specifically means an incarnation of a Hindu deity or an incarnation in human form. The term avatar applied to the world of virtual reality defines an entity generated by the virtual reality software application to represent a user. In current systems the avatar is an action or comic figure chosen by the user to represent the user's personality. The avatars can take human shape, the shape of an animal, or even a monster. When using an avatar-enabled 3D virtual reality interface, a user selects an avatar that can be unique with respect to that user. In this manner, the user can see the user as the avatar in the system and watch as the user navigates the landscape and interacts with the avatars of the other users. The avatar enables the user to feel part of the reality of the 3D environment.

Numerous 3D virtual reality worlds as described above exist in various types of applications. The first widespread use of such 3D worlds was in localized games and soon expanded into multi-user virtual worlds with the advent of the internet. Many of the internet systems that enable a user to experience 3D virtual worlds today involve such things as shopping and chatting. Some internet sites allow a user to pick or create an avatar and join the virtual world for a set fee per month. As a subscriber to this world the user can log on as the user's avatar, walk through the aisles and shops of a virtual mall, and purchase items. Other internet sites allow a user to assume an avatar representation and walk the halls of a live 3D chat environment. In such instances the user can logon and walk to certain desired rooms to see and meet the avatar representations of their friends.

Although numerous 3D virtual worlds exist on the internet today, they are severely limited. As previously mentioned, it is the goal of these systems to recreate normal every day occurrences and interactions as close to reality as possible. The systems that exist today are far from reality. Although the technology dictating computing processing power has significantly advanced, many other factors plague attempts at widely available virtual reality. In order to provide a realistic experience, one needs high quality communications and multimedia equipment. The majority of users accessing the internet today do so with a computer over a limited internet connection using an analog modem operating in the miniscule baseband spectrum of Plain Old Telephone Service (POTS). Creating a realistic virtual world interface is extremely difficult using the connection speeds of an analog modem. Reality comes through interaction with a multitude of users and events, thus virtual reality is significantly improved in systems where high bandwidth is available.

A realistic experience and interaction involves appealing to as many senses as possible. The most important of these senses are sight and sound. If a user is not visually and audibly stimulated by the given surroundings, then that user can have a harder time feeling as if the user is a part of a system.

Another problem with 3D virtual reality systems today is the fact that so many variations exist. With numerous vendors, versions of software, and client modifications it is difficult to achieve a standard for numerous users. The voluminous nature of virtual reality (VR) applications makes it difficult for users to congregate. A user essentially has no consistent and controlled arena in which to work, shop, and play.

SUMMARY OF THE INVENTION

This invention provides a system and/or method for a subscriber television system client device to provide a user interface comprising a three dimensional virtual reality media space. The client device exists within a three dimensional virtual reality media space system implemented in a subscriber television network. The user interface enables the user to navigate a three dimensional environment.

Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE SEVERAL VIEWS OF THE DRAWINGS

The accompanying drawings, incorporated in and forming a part of the specification, illustrate several aspects of the present invention, and together with the description serve to explain the principles of the invention. The components in the drawings are not necessarily to scale, emphasis instead being placed upon clearly illustrating the principles of the present invention. Moreover, in the drawings, like reference numerals designate corresponding parts throughout the several views. The reference numbers in the drawings have at least three digits with the two rightmost digits being reference numbers within a figure. The digits to the left of those digits are the number of the figure in which the item identified by the reference number first appears. For example, an item with reference number 209 first appears in FIG. 2. In the drawings:

FIG. 1A is a diagram of a high level view of the architecture in accordance with one preferred embodiment of the present invention;

FIG. 6 is a diagram describing a modification of the architecture in FIG. 1A to allow additional and alternative functionality in accordance with one preferred embodiment of the present invention.

DETAILED DESCRIPTION OF THE INVENTION

Figure 1B:
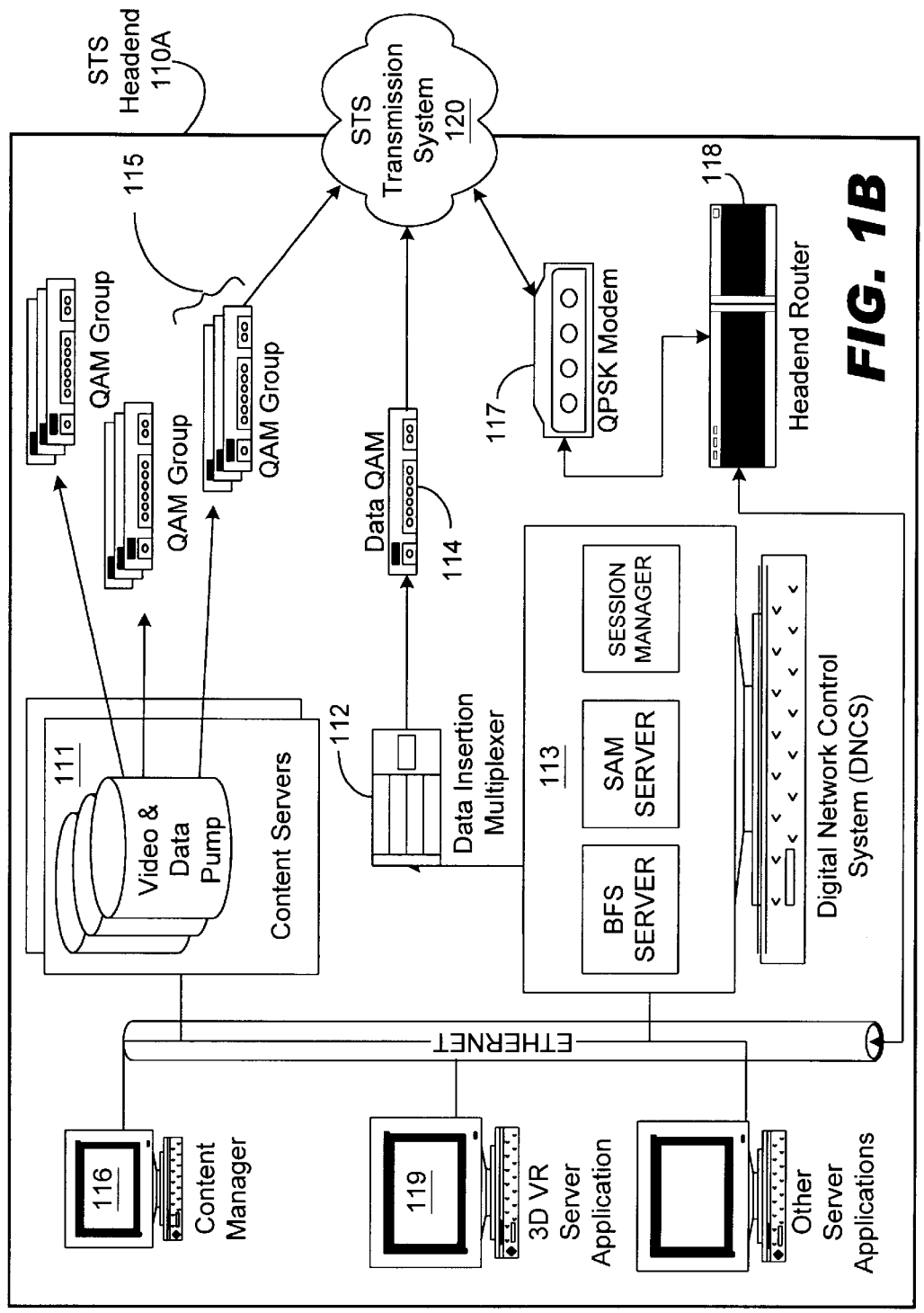
FIG. 1B is a diagram depicting the lower level details of a portion of the high level view of the architecture depicted in FIG. 1 in accordance with one preferred embodiment of the present invention.

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims. In addition, all examples given herein are intended to be non-limiting, i.e., among other examples considered to be within the scope of the present invention.

FIG. 1A describes a general hierarchy of the architecture employed in accordance with one embodiment of the current invention. Generally FIG. 1A depicts a Subscriber Television System (STS). An STS can be implemented in a variety of different environments, non-limiting examples including a cable television system, a satellite television system, a RF system, and a wireless transmission system. More specifically, the architecture displayed in FIG. 1A depicts a system that enables a user to interact with a 3D Virtual Reality Media Space System 170. The particular embodiment depicted in FIG. 1A applies specifically to a deployment of the 3D Virtual Reality Media Space System 170 in an STS. The STS Headend 110 is responsible for most activities involving the operations, administration, maintenance, and provisioning of the 3D Virtual Reality Media Space System 170. The STS Headend 110 transmits and receives information with the Client Devices 130 in the 3D Virtual Reality Media Space System 170 over the STS Transmission System 120. In one embodiment, the Client Device 1 130A receives and interprets information from the STS Transmission System 120 regarding a 3D Virtual Reality Media Space System 170 communication and in turn transmits user information regarding its user activity to the network. The Client Device 1 130A is responsible for processing and arranging data such that it can be transmitted to a Presentation System 1 150A to be experienced by the user.

The Presentation System 1 150A can be any system that enables a user to experience a session provided by the 3D Virtual Reality Media Space System 170. The Presentation System 1 150A can be, for example but not limited to, a television, a Personal Computer, a projection unit, a system including 3D goggles and headphones, or a simulator providing visual, audible, and physical stimulation. The Presentation System 1 150A processes information from the Client Device 1 130A and thereby the 3D VR Module 140A. The Presentation System 1 150A processes the information such that it can be viewed, heard, felt, or otherwise presented to the senses of the user. It is through the Presentation System 1 150A that the user is able to experience the Virtual Reality Media Space User Interface ("VR-MS-UI") 100. The user is able to give commands to Client Device 1 130A to effectively interact with the VR-MS-UI 100 through a Client Command Device 160A. The commands given by the Client Command Device 160A dictate, among other things, the execution of certain actions within the VR-MS-UI 100. With the use of the Client Command Device 1 160A and the Presentation System 1 150A the user can experience and interact with the 3D Virtual Reality Media Space System 170. In an alternate embodiment of the system depicted in FIG. 1A, the Client Device 1 130A and the Presentation System 1 150A can be implemented in the same device. In addition, the Client Command Device 1 160A could be incorporated into the entity containing the Client Device 1 130A and Presentation System 1 150A.

In accordance with one embodiment, the Client Device 1 130A is responsible for numerous functionalities. One functionality is the operation of the 3D VR Module 140A. The 3D VR Module 140A is a module that is executed by a combination of software and hardware components in one embodiment of the current invention. In one embodiment, the 3D VR Module 140A is completely separate from the other modules in the Client Device 1 130A. In one implementation of this embodiment, the 3D VR Module 140A is a completely independent entity in hardware that can be inserted and removed from an expansion slot in the Client Device 1 130A. Thereby, the 3D VR Module 140A can be upgraded through a hardware replacement. In an alternate implementation of this embodiment, the 3D VR module exists as a block of software within the Client Device 1 130A which can be remotely upgraded and modified by the 3D Virtual Reality Media Space System 170.

The 3D VR Module 140A handles the information and processing for the 3D Virtual Reality Media Space System 170 involving the Client Device 1 130A. In this manner, the 3D VR Module 140A controls and directs the Presentation System 1 150A such that the user can interact with the 3D Virtual Reality Media Space System 170 and discover a plurality of media.

FIG. 1B depicts an implementation of the STS Headend 110A in accordance with one embodiment of the present invention. STS Headend 110A is configured to provide numerous services to the Client Devices 130. One of the services is the 3D Virtual Reality Media Space System 170 (FIG. 1). In a non-limiting example, the 3D Virtual Reality Media Space System 170 (FIG. 1) is controlled from the headend by the 3D VR Server Application 119 (FIG. 1). The 3D VR Server Application 119 is responsible for reserving and configuring system resources needed to provide 3D Virtual Reality Media Space System 170 (FIG. 1) services and for providing configuration and service data to the 3D VR Module 140A (FIG. 1).

The Digital Network Control System (DNCS) 113 provides complete management, monitoring, and control of the network's elements and broadcast services provided to users. The DNCS 113 controls the Content Servers 111 which drive the Video & Data Pumps providing media to the STS Transmission System 120. In one implementation, the DNCS 113 uses a Data Insertion Multiplexer 112 and a Data QAM 114 to insert in-band broadcast file system (BFS) data in to a MPEG-2 transport stream that is broadcast over the STS Transmission System 120 to the Client Devices 130 (FIG. 1). The Content Servers 111 house the Video & Data Pumps which supply media to the Client Devices 130 (FIG. 1) through the QAM Group 115. The QPSK Modem 117 can be utilized to transport the out-of-band datagram traffic between the STS Headend 110A and the Client Devices 130 (FIG. 1). Through the use of the control and management devices in the STS Headend 110A, an administrator can control the services provided by the system and more specifically the 3D VR Media Space System 170 (FIG. 1).

Figure 1C:
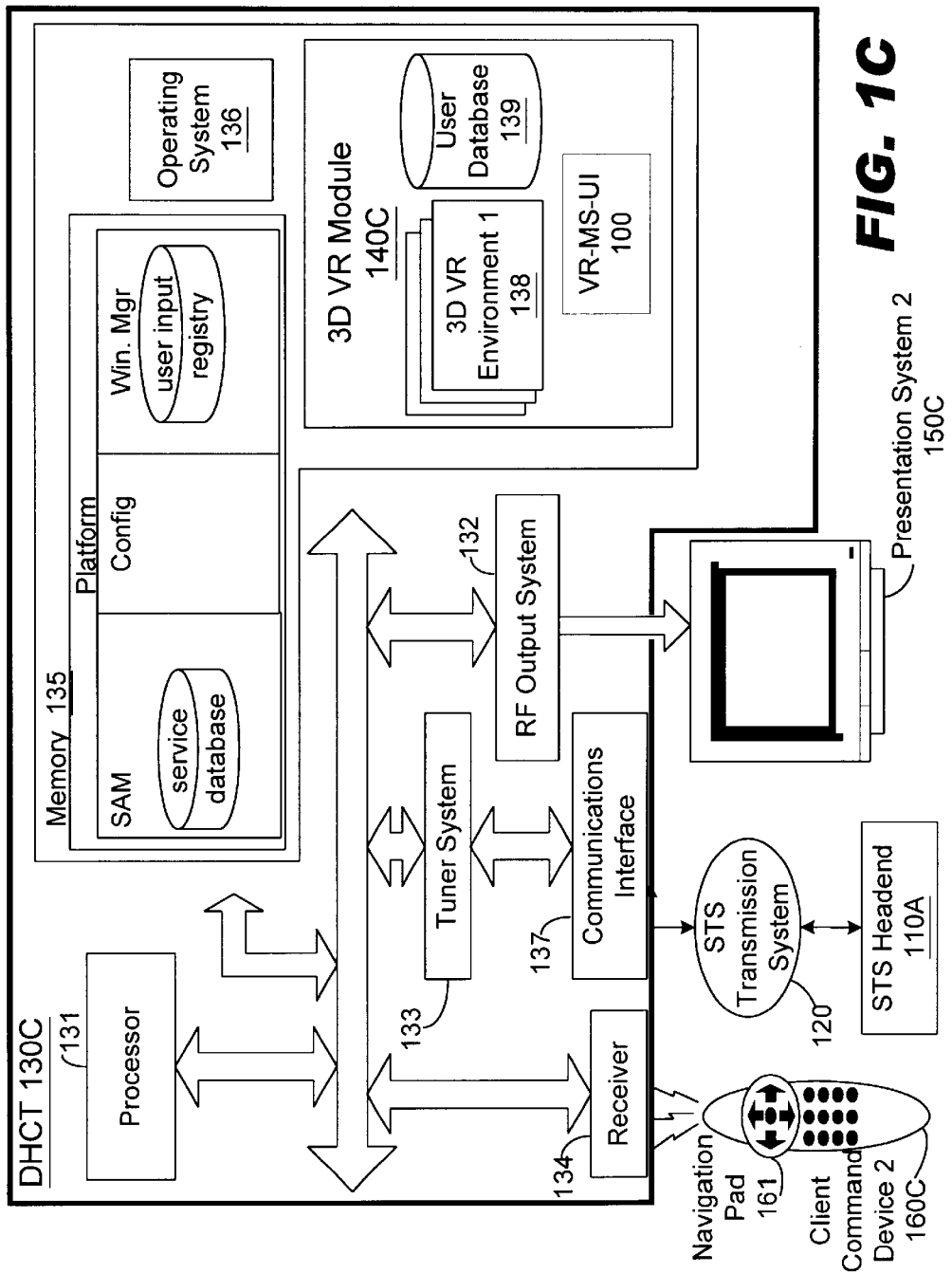
FIG. 1C is a diagram depicting the lower level details of a portion of the high level view of the architecture depicted in FIG. 1 in accordance with one preferred embodiment of the present invention.

FIG. 1C is a diagram depicting an implementation of one of the Client Devices 130 (FIG. 1) in accordance with one embodiment of the current invention. The device depicted in FIG. 1C is a Digital Home Communications Terminal (DHCT) 130C, a specific implementation of one of the Client Devices 130 (FIG. 1). The DHCT 130C is typically situated within a residence or business of a user. It may be integrated into a device that has display unit, such as a television set, or it may be a stand alone unit that couples to an external display. The DHCT 130C includes a processor 131 for controlling operations of the DHCT 130C, a video output port such as an RF output system 132 for driving the Presentation System 2 150C, and Tuner System 133 for tuning into a particular television channel to be displayed for sending and receiving various types of data from the STS Headend 110A (FIG. 1B). The Tuner System 133 includes, in one implementation, an out-of-band tuner for bi-directional Quadrature Phase Shift Keying (QPSK) data communication and a Quadrature Amplitude Modulation (QAM) tuner for receiving television signals. Additionally, DHCT 130C includes a receiver for receiving externally-generated information, such as user input from a Client Command Device 2 160C. In this implementation shown in FIG. 1C, the Client Command Device 2 160C is a remote control. Other types of client command devices such as a keyboard, a mouse, or a voice command may also provide the user inputs. The DHCT 130C may also include one or more wireless or wired communication interfaces, also called ports, for receiving and/or transmitting data to other devices.

Memory 135, such as non-volatile (i.e., SRAM) and Dynamic Random Access Memory (DRAM), is coupled to the Processor 131 and stores operation parameters, such as commands that are recognized by the Processor 131. The most basic functionality of the DHCT 130C is provided by an Operating System 136 that operates in Memory 135. One or more programmed software applications, herein referred to as applications, are executed by utilizing the computing resources in the DHCT 130C. The application executable program stored in Memory 135 is executed by Processor 131 (e.g., a central processing unit or digital signal processor) under the auspices of the Operating System 136. Data required as input by the application program is stored in Memory 135 and read by Processor 131 from Memory 135 as need be during the course of application program execution. Input data may be data stored in Memory 135 by a secondary application or other source, either internal or external to the DHCT 130C, or may have been created with the application program at the time it was generated as a software application program. Data may be received via any of the communication ports of the DHCT 130C, from the STS Headend 110A via the DHCT's network interface (i.e., the QAM or out-of-band tuners) or as user input via Receiver 134. A type of input data fulfills and serves the purpose of parameters as described below. Data generated by an application program is stored in Memory 135 by Processor 131 during the course of application program execution.

In accordance with the embodiment depicted in FIG. 1C, the 3D VR Module 140C is responsible for executing most functionality regarding the 3D VR Media Space System 170 (FIG. 1) in relation to DHCT 130C. The 3D VR Module 140C, is enabled to execute in accordance with the aforementioned interactions with, among other things, the Memory 135, the Processor 131, and the Operating System 136. The data inputted by the user with the Client Command Device 2 160C is interpreted by the Receiver 134, stored in Memory 135, and assigned to the 3D VR Module 140C by the Operating System 136. The 3D VR Module 140C executes, on the Processor 131, the commands provided by the user in addition to those received through the Communications Interface 137 provided by the STS Headend 110A. In addition to the received commands, the 3D VR Module 140C also requires that certain application specific stored information be executed by the Processor 131. A non-limiting example is illustrated by the 3D VR Environment 1 138 stored as part of the 3D VR Module 140C. The 3D VR Environment 1 138 contains pre-configured information that, once executed by the Processor 131, can be outputted to the RF Output System 132 to be displayed on the Presentation System 2 150C as the background of the VR-MS-UI 100. The user can interact with the shown VR-MS-UI 100 to explore the presently available media space. The 3D VR Module 140C is enabled to store information pertaining to a specific user in the User Database 139. Thereby, when a specific user accesses the 3D VR Module 140C, the module can cause data associated with that user to be loaded into the Processor 131, outputted on the RF Output System 132, and displayed within the VR-MS-UI 100. As will be shown below, the 3D VR Module 140C is capable of providing numerous different kinds of VR-MS-UI 100 implementations.

Figure 2:
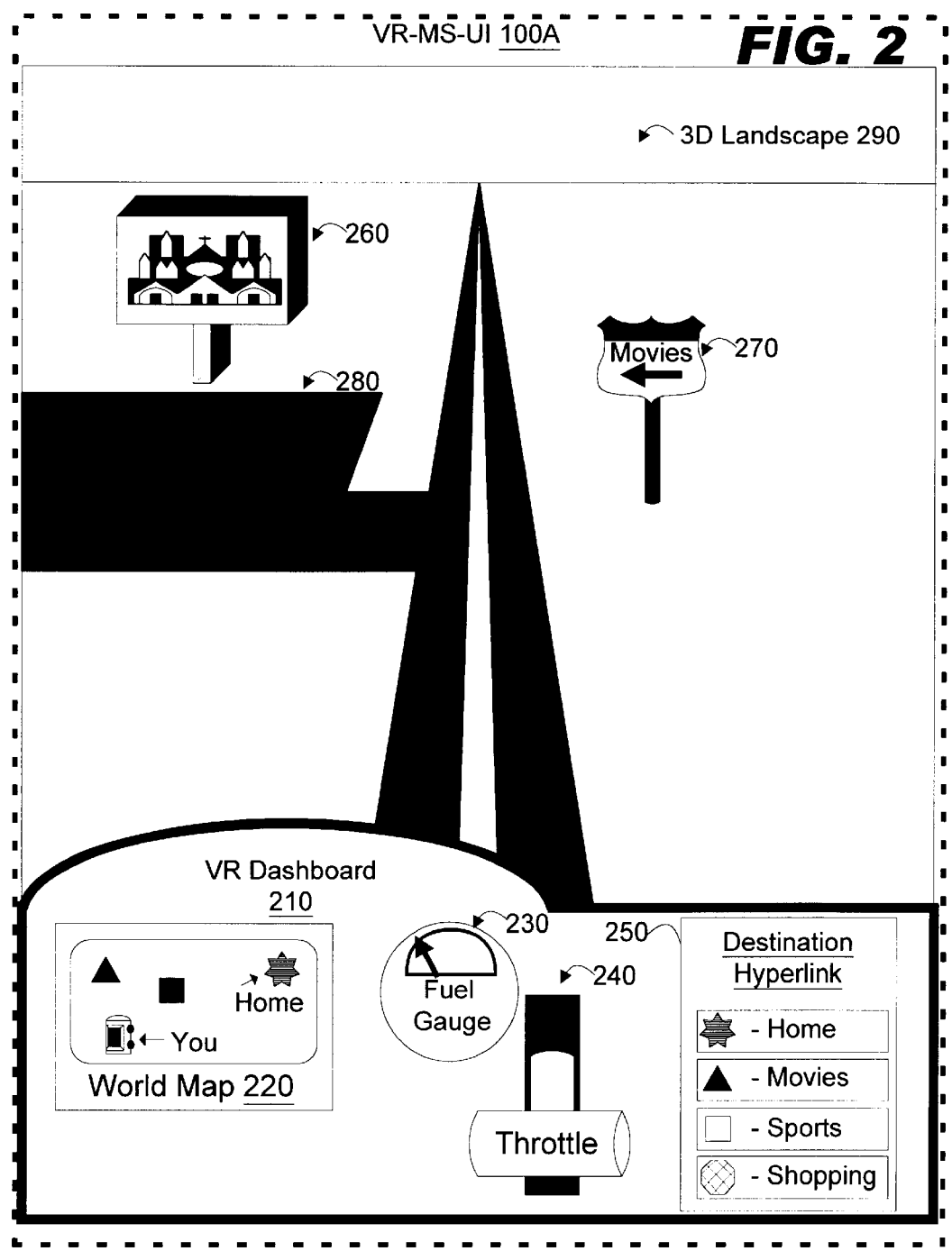
FIG. 2 is a diagram of a snapshot of the user interface displayed by the system depicted in FIG. 1 in accordance with one preferred embodiment of the present invention.

FIG. 2 is an illustration of a snapshot of the VR-MS-UI 100 (FIG. 1A) in accordance with one embodiment of the current invention. In the embodiment of the current invention depicted in FIG. 2, the VR-MS-UI 100A consists of a vehicle navigating a 3D Landscape 290. It is respectfully submitted that it will be clear to those of ordinary skill in the art that the navigation of the vehicle incorporates a maneuverability function that could be implemented in various alternative ways, such as driving, walking, or flying. In a non-limiting example, the navigation commands could be provided by the Client Command Device 2 160C (FIG. 1C). The user could utilize the Navigation Pad 161 (FIG. 1C) to maneuver around in the 3D Landscape 290 by pressing the up button to move forward and similar buttons for other directions. The Client Command Device 2 160C (FIG. 1C) could also be other instruments, such as a joystick or a mouse.

This particular application of the VR-MS-UI 100 (FIG. 1A) accepts commands from the user that dictate the way in which a virtual vehicle moves about. This virtual vehicle is shown in part by a VR Dashboard 210. The snapshot in FIG. 2 shows the viewpoint of the avatar of the user sitting in the virtual vehicle, though the avatar itself is not shown from this perspective. The snapshot shown in FIG. 2 depicts the vehicle moving down the road with different attractions along the way. One of the attractions is indicated by a Movies 270 sign positioned along the side of the road. The Movies 270 sign indicates an area where the user can direct the virtual vehicle to pull over into a parking lot 280 and watch a movie. In one embodiment of the current invention, the roadside movie attraction would act similar to a drive-in-movie. The user would position the virtual vehicle such that the movie showing on the selected billboard 260 was in full screen view inside the VR-MS-UI 100A.

It is respectfully submitted that one skilled in the art would recognize that movie billboard 260 could be one of a multitude of billboards. This would enable a number of movie screens with looping trailers to be visible from which the user could choose to view. In one embodiment, the Client Device 1 130A (FIG. 1A) could interpret various signals contained in one RF channel, and output a movie stream or information concerning the movies to the Presentation System 1 150A (FIG. 1A). In another embodiment, the Client Device 1 130A (FIG. 1A) could have multiple tuners which simultaneously output multiple movie streams or information concerning the movies. In addition, these movies could be grouped on a movie billboard 160, or sets of movie billboards, according to common themes or by customer selected favorite groupings. In an alternative embodiment the billboard 260 would display other media comprising the TV channels received by the Client Device 1 130A (FIG. 1), advertisements, or web pages.

To implement the functions desired the user could, in part, make use of the controls on the VR Dashboard 210. A World Map 220 is a feature that indicates the user's position within the entire current 3D virtual world in relation to other attractions and elements inside the world. This feature allows the user to be cognizant of those things outside of his/her view. The embodiment of invention in FIG. 2 shows the World Map 220 indicating the current user position with a star icon and the movies up ahead with the triangle icon. Alternatively, the user can jump to certain positions within the 3D world using the Destination Hyperlinks 250 feature. The Destinations Hyperlink 250 feature is depicted on the right side of the dashboard and allows the user to instantaneously jump to certain areas of the 3D world. In this manner, the user could choose not to personally navigate the 3D Landscape 290 but simply select the desired destination on the Destination Hyperlink 250 and go there immediately. If the user chooses to navigate the 3D Landscape 290 in the virtual vehicle, then the user can control the speed of movement of the virtual vehicle with the Throttle 240 on the VR Dashboard 210. Moving the Throttle 240 forward would cause the virtual vehicle to traveler faster down the road ahead to another desired location. In a non-limiting example, the user would be enabled to move the Throttle 240 through the use of a Client Command Device 2 160C (FIG. 1C). The user could use the Client Command Device 160C 2 (FIG. 1C) to select the Throttle 240 and then use the up arrow on the Navigation Pad 161 (FIG. 1C) to throttle up and the down arrow to throttle down. Selection of the Throttle 240 or other elements of the VR Dashboard 210 could occur through any of a variety of methods. For example, a free floating arrow, similar to a conventional Personal Computer mouse pointer, could be displayed and controlled by the Navigation Pad 161 (FIG. 1C) on the Client Command Device 2 160C (FIG. 1C). Another example, among others, includes highlighting, or bringing in focus, various elements of the VR Dashboard 210 in a looping manner among all selectable items such that a user simply cycles through the items with an arrow key until hitting a select button in order to utilize a particular element.

The VR Dashboard 210 can be adapted in many different ways to add or drop numerous other features, including as non-limiting examples, a chat tool and a directional instrument. In one embodiment, the VR Dashboard 210 could change specific to the particular application of VR-MS-UI 100 (FIG. 1A) that is running. The VR Dashboard 210 features could also change as dictated by the VR-MS-UI 100A dependent upon what area of a 3D Virtual World the user is located. For example, but not limited to, the snapshot in FIG. 2 shows the user near the Movies 270 activity area. It would behoove the user in the Movies 270 activity area to have features on the dashboard associated with viewing a movie. In one embodiment, the VR Dashboard 210 might be outfitted to include trick modes such as fast forward, rewind, pause and stop. In a similar embodiment the VR Dashboard 210 might have such features to allow the user to select the language of a movie, see its trailers, or special additions. The VR Dashboard 210 might also have a chat functionality feature. In this embodiment the user might be able to select the group of other users he wants to chat with and/or what topics he desires to chat about. As previously mentioned, the VR-MS-UI 100A could be configured such that a new set of features would be displayed on the VR Dashboard 210 upon leaving the movie area and going into a shopping area. In one embodiment, a user would be presented with VR Dashboard 210 features such as a credit card, a shopping list, a list of items in a shopping cart, and numerous other functionality specific to shopping.

An alternative or additional embodiment to the VR-MS-UI 100A discussed above would allow a user to get involved in activities with a friend. The VR-MS-UI 100A would provide the user with an option to enter an invite screen in which all users or certain sets of users available for invitation would be listed. Through the invite screen, the user could select certain friends to be prompted to join their session. For example, but not limited to, the user could invite a friend(s) to join him/her in the virtual vehicle discussed above. With a friend in the vehicle, the two companions could participate in media events together. The meeting of friends would involve two users directing their avatars to meet at a location and get in a common virtual vehicle. While exploring the 3D world, the two users could look at each others avatar in the seat next to them and converse as friends would in an ordinary car ride. The virtual vehicle would allow the two companions to experience media events together and even utilize the Destination Hyperlink 250 feature in group mode. Thus, when one user decided to "warp" to a specific location with the Destination Hyperlink 250, his/her friends traveling in the same virtual vehicle would be warped to the same location.

Figure 3:
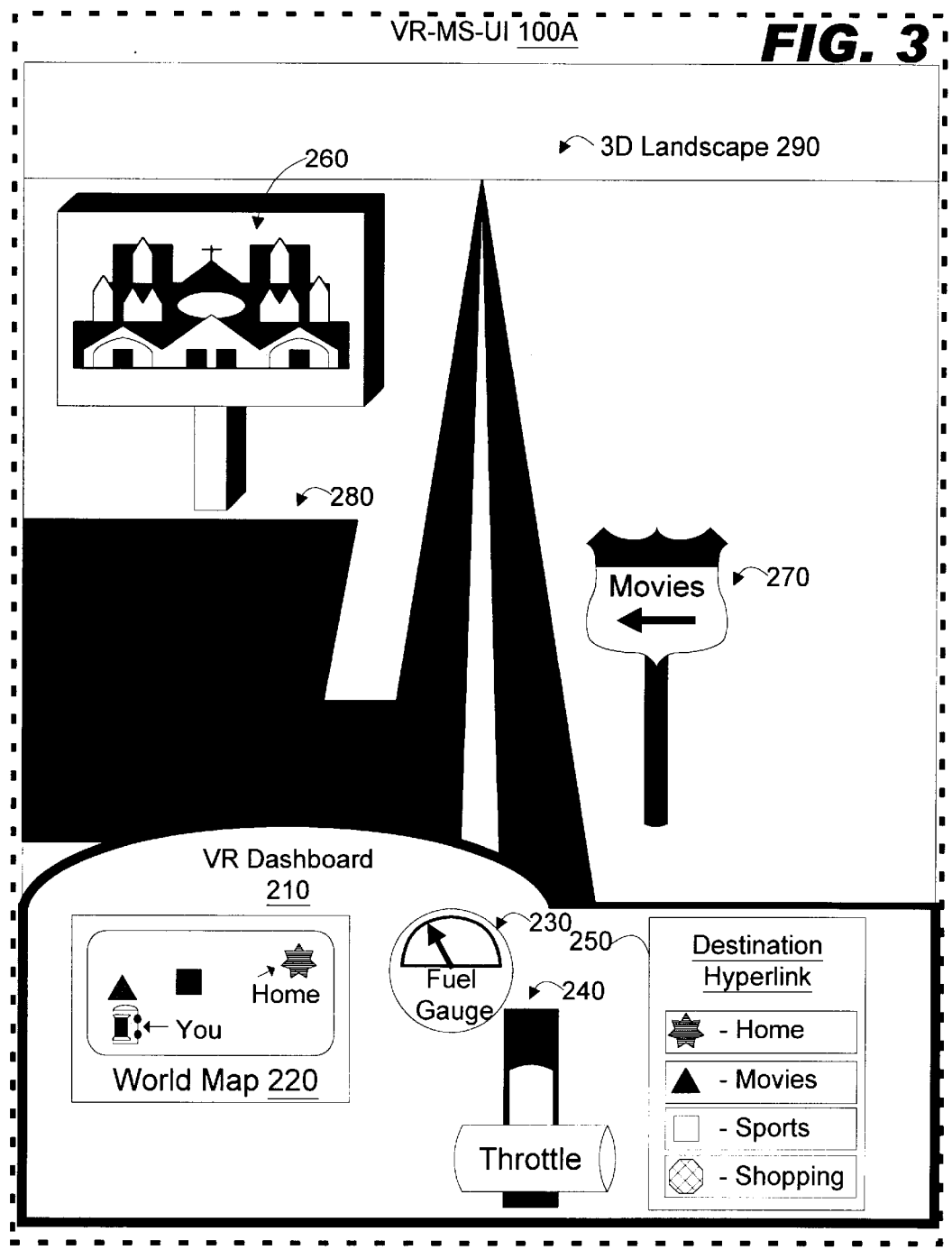
FIG. 3 is a diagram of a snapshot demonstrating a continuation of movement by the user from FIG. 2.

FIG. 3 is an illustration of a continuation of the movement of the user in the virtual vehicle described in conjunction with FIG. 2. Examination of the two figures together will illustrate that FIG. 3 simply demonstrates the progression of the user's view as the user moves up the road in the 3D Landscape 290 (FIG. 2). The parking lot 280 (FIG. 2) for the movie attraction is now closer, along with the Movie sign 270 (FIG. 2) and the movie display billboard 260 (FIG. 2). In one embodiment, the user would simply direct the virtual vehicle to pull into the parking lot 280 and position the virtual vehicle such that the move display billboard 260 was in full view. It is noted that the World Map 220 dynamically updates in conjunction with the user's movement from the position depicted in FIG. 2. The World Map 220 (FIG. 2) shows that the triangle icon, representing the movie attraction, is now directly in front of the star icon, representing the user's location. The snapshot of FIG. 2 and FIG. 3 show the user maneuvering about the 3D Landscape 290. If the user had decided to warp to the movie location instead, the user could have simply activated the movies function with the triangle icon in the Destination Hyperlink 250 tool.

In an alternative embodiment of the current invention, the VR-MS-UI 100A would be configured to allow access to the 3D virtual world on a conditional basis. The conditional basis would be dependent upon a dynamic variable. This dynamic variable would be configurable to be dependent upon certain actions. In one embodiment, access to the virtual world would be denied when the value of the dynamic variable equaled zero. The dynamic variable could be configured to decrease in value based upon certain events comprising the viewing of certain media, entering a restricted area, and linking to another environment. The dynamic variable could also be configured to increase in value based on certain events comprising viewing of advertisements, executing purchases, linking to external environments, and purchasing an increase in value of the variable.

One implementation of this embodiment would base such limited access on a feature much like the Fuel Gauge 230 on the VR Dashboard 210. The level of the Fuel Gauge 230 would indicate to the user the amount of time remaining to visit the 3D world or the remaining distance that could be traveled. The conditional nature of the access to the 3D world could be based upon many factors. For example, but not limited to, the Fuel Gauge 230 could be filled up when a user visits a particular store, views a particular advertisement, or pays a certain fee. In this manner, a user might pay a set fee for a certain number of access minutes per month. The user might, in another instance, have to purchase something within the 3D world to maintain ability to access. In any case, administrators of the 3D Virtual Reality Media Space 170 (FIG. 1A) would be given the functionality to configure the system such that it performs to desired specifications.

Figure 4:
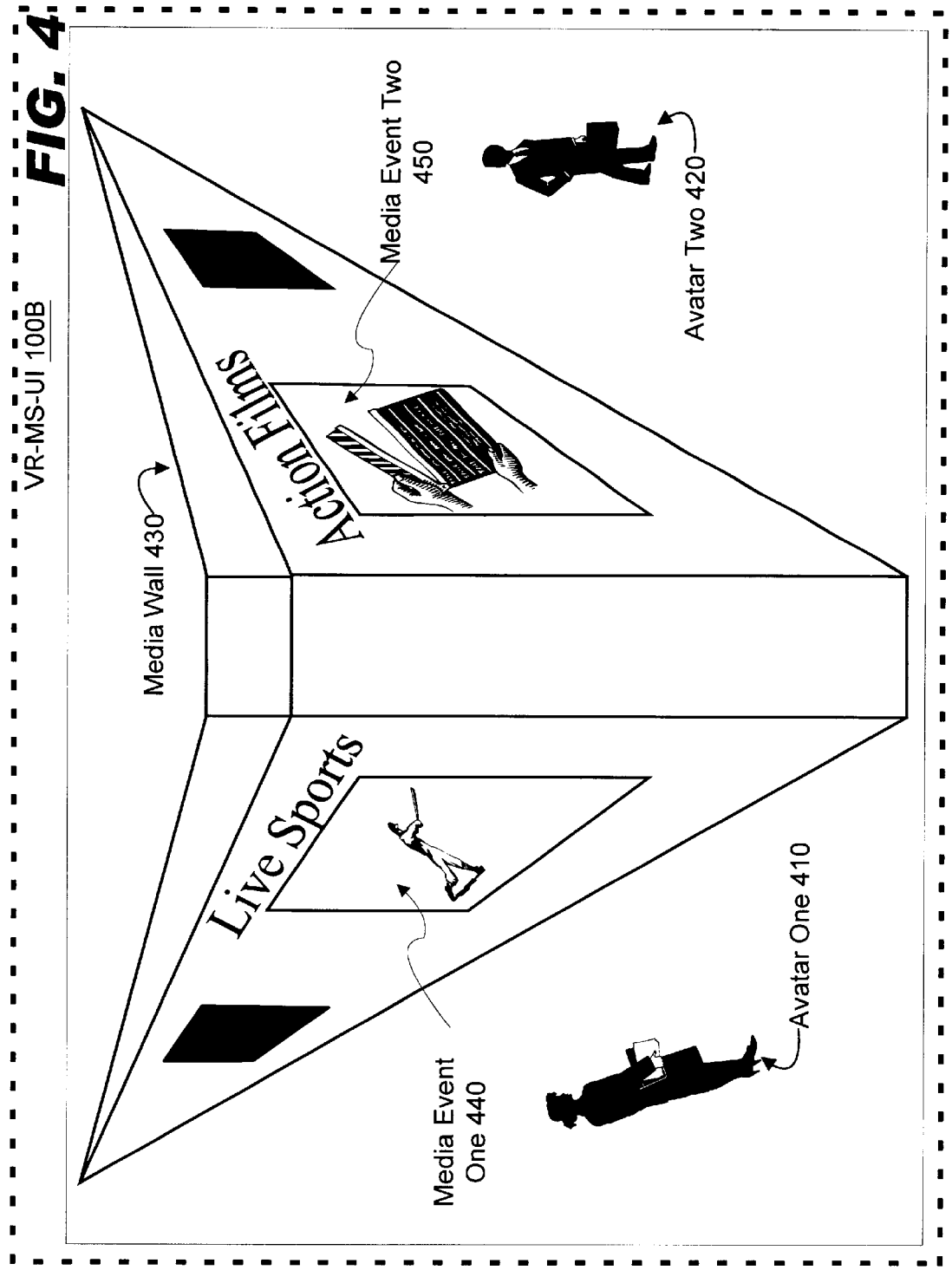
FIG. 4 is a diagram of a snapshot of an alternative user interface displayed by the system depicted in FIG. 1 in accordance with one preferred embodiment of the present invention.

FIG. 4 is a diagram that illustrates an alternative embodiment of the VR-MS-UI 100 (FIG. 1A) to the user interface depicted in FIG. 2 and FIG. 3. In FIG. 4 the user navigates the 3D world by causing the avatar to walk around. As mentioned previously, an avatar is an icon that represents a user in an application. In FIG. 4 we see that Avatar One 410 takes the shape of a woman. In this application, one particular user is represented by Avatar One 410 and that user's actions are implemented by that avatar. The discretion of the user can determine whether the viewpoint will be from the eyes of the avatar character or an "over the shoulder" viewpoint of her avatar. In any manner, VR-MS-UI 100B allows the user to cause Avatar One 410 to walk around the landscape. The 3D World given by VR-MS-UI 100B is an area where a user can walk along and watch events on the Media Wall 430. As shown in FIG. 4, the Media Wall 430 displays numerous media events. The user can take part in viewing these media events simply by walking along the Media Wall 430 and bringing a certain event into view within the user interface. An alternative embodiment might allow the user to walk up to a media event and select a certain event to be shown in full screen mode, similar to a normal television display. In FIG. 4 we can see that Avatar One 410 has wandered up to Media Event 440 and is watching the Live Sports event that is being displayed. If the user controlling Avatar One 410 desires to view something else, then that user can simply continue to stroll down the extensive Media Wall 430 and find an event of interest. The Media Wall 430 can contain video streams from numerous television channels, interactive program guides, videos on demand, web pages, advertisements or any other type of media. In a non-limiting example, a Client Device containing multiple tuners could show several small billboards simultaneously displaying currently tuned TV channels that could be selected by the user for full screen viewing. In an alternative implementation, a Client Device with one tuner could tune to a frequency containing a signal with multiple lower bandwidth TV channels concatenated into that one signal. In this manner, the Client Device might simultaneously display multiple TV channels on multiple billboards of a lower bandwidth.

In addition to interacting with media, a user can also interact with other avatars. For instance, Avatar One 410 could walk over to Avatar Two 420 and converse. A user's avatar can interact with a multitude of other users' avatars throughout the 3D world.

It is respectfully submitted that the VR-MS-UI 100 (FIG. 1A) can allow access to many different kinds of media, not simply just enhanced 3D media. As alluded to above, the user has the option to link to a traditional television channel. The user might also have the option to view a web page. The dynamic nature of the VR-MS-UI 100 (FIG. 1A) is very powerful in that a user can access whatever type of media is most suitable for a given circumstance. For example, but not limited to, if the user was browsing the showroom floor of a car dealership it would be beneficial to the see the car in 3D. On the other hand, when the user was ready to look at specifications, a traditional 2D specification list would be the most appropriate display. This 2D specification list would be accessible to the user by simply activating that feature in the virtual car dealership. In a similar manner, if a user did not want to maneuver along the Media Wall 430 to find a channel to watch, that user could access a more traditional 2D-programming guide to find something of interest.

Figure 5:
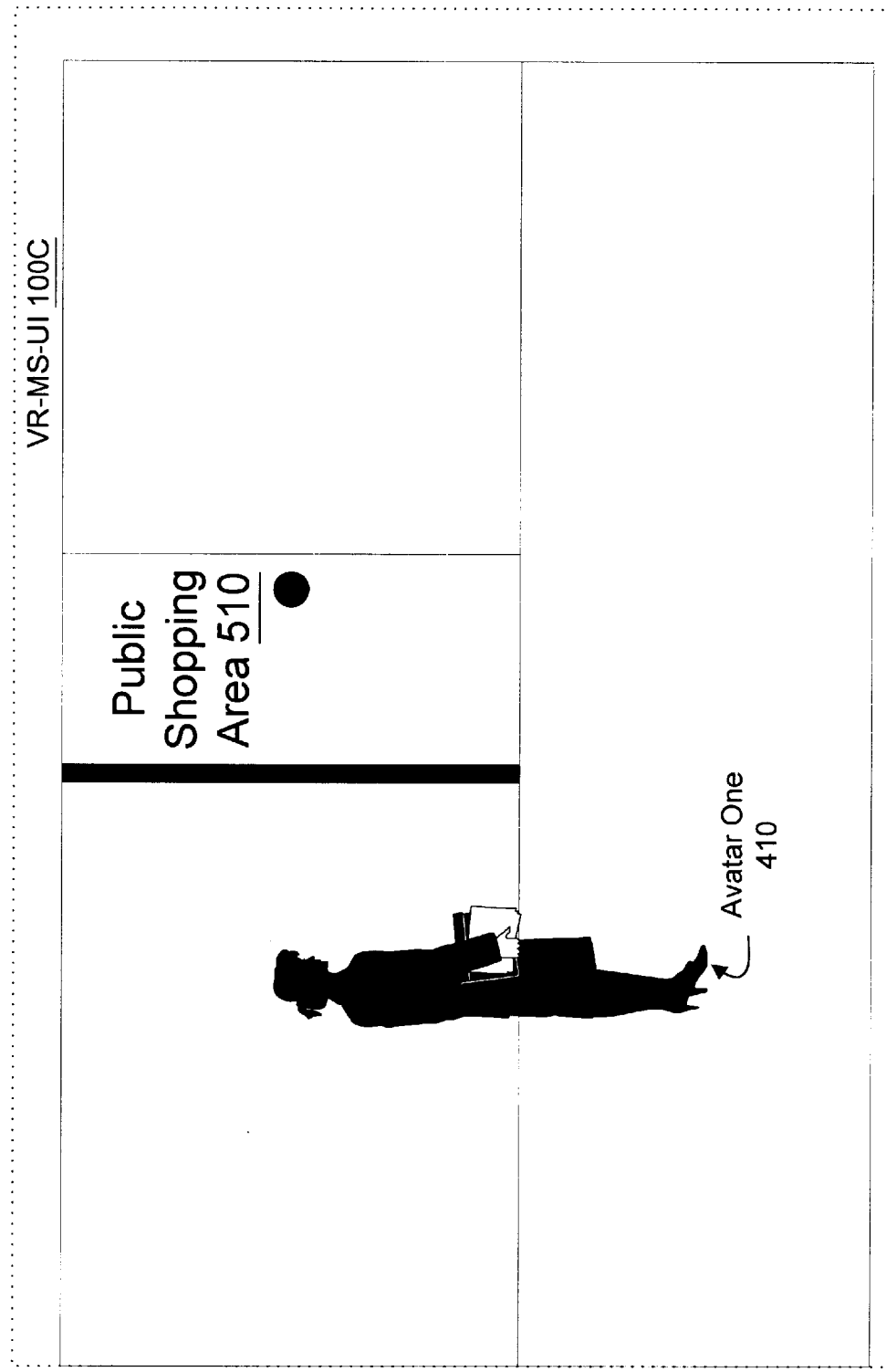
FIG. 5 is a diagram of a snapshot of a portal to another user interface displayed by the system depicted in FIG. 1 in accordance with one preferred embodiment of the present invention.

FIG. 5 is a diagram of snapshot from VR-MS-UI 100C that shows a portal to another area. In one embodiment the user can instruct her avatar to open the door labeled Public Shopping Area 510. The door symbolizes a portal into another environment. Through the use of portals, administrators of a 3D Virtual Reality Media Space System 170 (FIG. 1A) can restrict and assign access to different areas and applications. In the embodiment pictured in FIG. 5, the VR-MS-UI 100C can allow Avatar One 410 to access a Public Shopping Area 510. This Public Shopping Area 510 could be an application independent to the current application and also could be run on a different server or by a different company. The 3D Virtual Reality Media Space System 170 (FIG. 1A) enables the ability to restrict access to portals based on the user or any other criteria. In one embodiment, the user might have to direct Avatar One 410 to pay a certain fee in order to access the Public Shopping Area 510. The Public Shopping Area 510 could be another area of the current VR-MS-UI 100C or an entirely different user interface.

FIG. 6 illustrates an architecture of the 3D Virtual Reality Media Space System 170 (FIG. 1A) in which the user can associate personal features with his/her avatar in accordance with one embodiment of the current invention. A discussion presented above concerned the fact that one cannot feel they are part of a system until they can picture themselves in that system. The architecture outlined in FIG. 6 allows the user to feel a part of a system by allowing that user to project real life personal traits onto the avatar that represents that user in the 3D world. Through the use of the Reality Insertion Device 610A, the user can apply personal traits to their avatar. In one embodiment, the Reality Insertion Device 610A is a digital camera. In this embodiment the 3D VR Module 140A (FIG. 1A) receives input from the digital camera in the form of a picture of the user. The 3D VR Module 140A (FIG. 1A) interprets this digital picture and processes the picture such that it is applied to the avatar representing the user in the 3D world. A continuation of this embodiment would allow the 3D VR Module 140A (FIG. 1A) to accept multiple pictures to be used at different times by the avatar. For instance, but not limited to, the avatar might show a smiling photo of the user when greeting another avatar. In an alternative embodiment, the Reality Insertion Device 610A is a video camera. In this embodiment the 3D VR Module 140A (FIG. 1A) receives information from a video camera recording footage of the user. The 3D VR Module 140A (FIG. 1A) interprets the information and inserts that video upon the user's avatar. In this manner, the personality, feelings, and characteristics of the actual user in reality would appear as a part of the virtual reality in the 3D world. When walking around and conversing with other avatars in the 3D world, one could actually see real life recreations of the other users.

One feature enabled by the video avatar embodiment is that of companionship activities. For instance, but not limited to, consider two people who live a great distance from each other. Through the use of the 3D Virtual Reality Media Space System (FIG. 1A), these two people could agree to meet as avatars in the 3D world. The users could partake in an event such as a concert. The avatars of the two users could sit side by side on the balcony of a concert hall, enjoy the show, converse, and watch the reaction of each other in live video projection upon their respective avatars.

Another alternative of the current invention is also depicted in FIG. 6 in which the 3D Virtual Reality Media Space 170 (FIG. 1A) could connect to any network such as the Public Network 620. The Client Devices 130 (FIG. 1A) of such an embodiment would operate independently of the headend network. One implementation of this embodiment would involve enabling the Client Devices 130 (FIG. 1A) to transmit data between other subscribers over the internet. An alternative implementation might involve the Public Network 620 consisting of specific 3D Virtual Reality Media Space System 170 (FIG. 1A) servers. These servers would interpret all transmitted and received information from the Client Devices 130 (FIG. 1A) and pass that information to distant severs or clients over the internet.

The VR-MS-UI of the present invention can be implemented in hardware, software, firmware, or a combination thereof. In the preferred embodiment(s), the VR-MS-UI is implemented in software or firmware that is stored in a memory and that is executed by a suitable instruction execution system. If implemented in hardware, as in an alternative embodiment, the VR-MS-UI can be implemented with any combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The VR-MS-UI program, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In concluding the detailed description, it should be noted that it will be clear to those skilled in the art that many variations and modifications can be made to the preferred embodiment without substantially departing from the principles of the present invention. All such variations are intended to be included herein within the scope of the present invention, as set forth in the following claims.

Therefore, having thus described the invention, at least the following is claimed:

1. A method in a Subscriber Television System (STS) client device of providing a user interface, the method comprising steps of:

implementing the user interface to be a three-dimensional (3D) user interface; displaying to a user a Virtual Reality (VR) media space in the 3D user interface, the 3D user interface enabling a plurality of navigation functions, the plurality of navigation functions enabling the user to maneuver through the VR media space, the VR media space comprising a virtual world of a plurality of media, the plurality of navigation functions enabling the user to maneuver in the VR media space such that one or more of the plurality of media is viewable, the plurality of media comprising a plurality of video streams, a plurality of advertisements, a plurality of avatars, and a plurality of user communications;

enabling the user to select an object in the VR media space and link to a secondary interface, the secondary interface comprising a full screen view of a television channel, a video, a web page, a programming guide, and an interact programming guide;

displaying at least one of a plurality of avatars to represent the user, said at least one plurality of avatars being implemented to be augmented by a reality insertion device providing a plurality of character information, the plurality of character information comprising a picture of the user, at least one picture from a digital camera, and at least one video from a video camera; and granting access to said VR media space based upon a dynamic variable, the dynamic variable being configured to change in value upon the occurrence of an event, the event comprising a debiting event and a crediting event, the debiting event comprising viewing a plurality of media, entering a particular domain, and linking to an external environment, the crediting event comprising viewing a plurality of advertisement media, executing a purchase of an element in said VR media space, linking to an external environment, and purchasing an increase in said dynamic variable.

2. A method in a Subscriber Television System (STS) client device of providing a user interface, the method comprising the steps of:

implementing the user interface to be a three-dimensional (3D) user interface;

displaying in the 3D user interface a Virtual Reality (VR) world having a 3D landscape and a Virtual Reality (VR) media space to a first user;

navigating through the VR world to access services offered through a Subscriber Television System (STS), wherein the STS client device is coupled to the STS;

displaying in the 3D user interface an avatar of a second user to the first user; and enabling the first user to maneuver through the VR World by selectively jumping to predetermined positions in the VR World, wherein responsive to the first user jumping from a first position in the VR World to a second position in the VR World, the avatar of the second user jumps to the second position.

3. The method of claim 2, wherein the VR media space includes a plurality of media.

4. The method of claim 3, wherein the plurality of media comprises a plurality of video streams, a plurality of advertisements, a plurality of avatars, and a plurality of user communications.

5. The method of claim 3, wherein one or more of the plurality of media is enabled to be selected by the first user to be displayed in full screen mode.

6. The method of claim 4, wherein the plurality of navigation functions enable the first user to maneuver in the VR media space such that one or more of the plurality of media is viewable.

7. The method of claim 6, wherein the VR media space comprises a plurality of billboards displaying the plurality of media.

8. The method of claim 7, wherein the plurality of navigation functions enable the first user to maneuver in the VR media space such that one or more of the plurality of billboards is viewable.

9. The method of claim 8, wherein the plurality of billboards displaying the plurality of media comprises the plurality of video streams.

10. The method of claim 9, wherein the plurality of video streams comprises the television channels currently being received by the STS client device.

11. The method of claim 10, wherein the STS client device is enabled with a plurality of tuners, the amount of the plurality of tuners enabling an equal amount of the plurality of video streams to be displayed simultaneously.

12. The method of claim 1, wherein the 3D user interface includes a navigation controller having a plurality of navigation functions, the plurality of navigation functions enabling the user to navigate through the VR world.

13. The method of claim 12, wherein the plurality of navigation functions enable the first user to select an object in the VR media space and link to a two-dimensional (2D) user interface.

14. The method of claim 13, wherein the object is a billboard displaying a video stream of a television channel currently being received by the STS client device.

15. The method of claim 13, wherein the 2D user interface is a web page.

16. The method of claim 13, wherein the 2D user interface is an interactive program guide displaying programming information for the STS client device.

17. The method of claim 12, wherein the plurality of navigation functions enable the first user to select on an object in the VR media space and link to a 3D VR media space not contained within current the VR media space.

18. The method of claim 12, wherein the plurality of navigation functions enable the first user to selectively jump to positions in the VR world.

19. The method of claim 2, wherein a secondary portion of the 3D user interface is a map view of a larger area of the VR media space than is currently visible in a primary portion of the 3D user interface.

20. The method of claim 19, wherein the map view of a larger area of the VR media space displays a dynamically updating aerial view of the VR media space, the dynamically updating aerial view of the VR media space comprising an indication of the first user's position in relation to a plurality of elements in the VR media space.

21. The method of claim 4, further comprising a reality insertion device providing a plurality of character information to the STS client device.

22. The method of claim 21, wherein the plurality of avatars are implemented to be augmented by the plurality of character information.

23. The method of claim 22, wherein the plurality of character information comprises a picture of the first user.

24. The method of claim 22, wherein the reality insertion device comprises a digital camera enabled to provide a plurality of pictures of the first user as a plurality of character information.

25. The method of claim 22, wherein the reality insertion device comprises a video camera enabled to provide a video of the first user as a plurality of character information.

26. A method in a Subscriber Television System (STS) client device of providing a user interface, the method comprising the steps of:

implementing the user interface to be a three-dimensional (3D) user interface;

displaying in the 3D user interface a Virtual Reality (VR) world having a 3D landscape and a Virtual Reality (VR) media space to a first user;

navigating through the VR world to access services offered through a Subscriber Television System (STS), wherein the STS client device is coupled to the STS;

displaying in the 3D user interface at least a portion of a dashboard of a transportation device belonging to an avatar of the user, wherein the dashboard includes a map of the VR World and jump selection control panel, and wherein the map shows the current position of the avatar in the VR World; and selecting from the jump selection control panel a predetermined destination in the VR World, wherein responsive to the user selecting the predetermined destination the map reflects the new position of the avatar in the VR World.

* * * * *